Oct. 13, 1931.        N. WARSHAW        1,826,909
SEPARABLE FASTENER
Filed Aug. 21, 1930
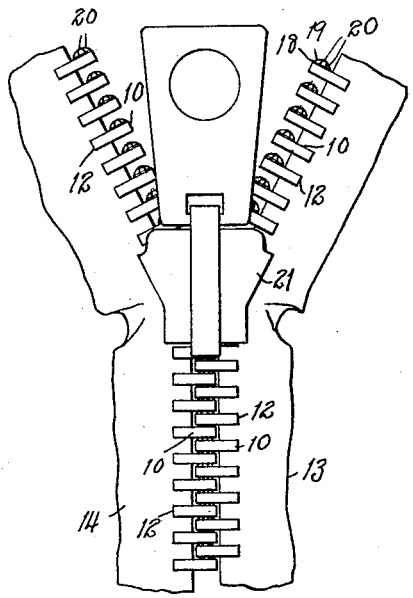
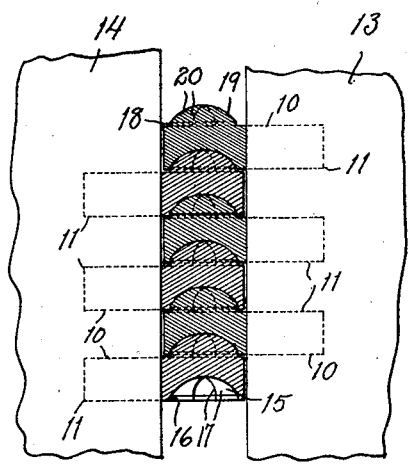
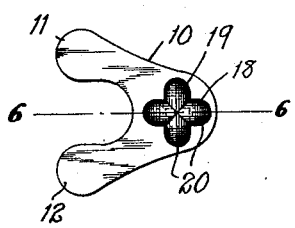
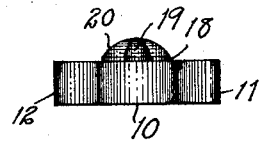
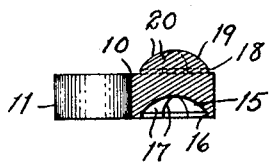
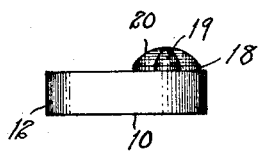

Patented Oct. 13, 1931

1,826,909

UNITED STATES PATENT OFFICE

NATHAN WARSHAW, OF BROOKLYN, NEW YORK

SEPARABLE FASTENER

Application filed August 21, 1930. Serial No. 476,839.

This invention relates to an improvement in separable fasteners, that is, devices adapted to be clamped to the edges of strips of material, or to parts to be connected together, provided on their upper faces with projections and their under faces with corresponding recesses which will interlock with complementary members arranged on the opposite side of the opening, these members being interlocked by means of a slider.

The object of this invention is to so form the interlocking members that they will readily come into line, but permit a certain amount of rocking movement without the danger of separation, and the invention consists in the construction as hereinafter described and particularly recited in the claims.

In the accompanying drawings:

Fig. 1 is a front view of a series of separable fasteners constructed in accordance with my invention;

Fig. 2 is a sectional view of a series of fastening members in interlocked relation;

Fig. 3 is a plan view of one of the fastening members detached;

Fig. 4 is a side view of the same;

Fig. 5 is an end view of the same; and

Fig. 6 is a sectional view on the line 6—6 of Fig. 3.

In carrying out my invention, the fastening members 10 are formed from small pieces of metal, the inner ends being divided to form two jaws 11 and 12, which are adapted to be clamped to strips 13 and 14 of tape or other material at the edges of an opening to be closed.

At the outer end these clamping-members are each formed in one face with a recess 15 shaped to form a shoulder 16 and four equally-spaced, radially arranged, rounded pockets 17, and the formation of the recess 15 and pockets 17 produces a corresponding shoulder 18 and stud 19 comprising four equally-spaced, radially-arranged, rounded ribs 20, the stud on one member adapted to enter the recess in an oppositely-arranged fastener. These fasteners are brought into interlocking engagement by means of a slide 21 in the usual manner.

By forming the studs with shoulders and four equally-spaced, radially-arranged, rounded ribs, and the recesses of corresponding shape, the members not only come together more readily when moved into the locking position by the slide, but permit a certain amount of rocking movement in four directions, so that the fastening device will conform to the lines taken by the material to be fastened together and without danger of the fasteners becoming separated or jammed at short bends, so as to interfere with the movement of the slide.

I claim:

1. A member for separable fasteners, comprising a block formed at its inner end with clamping-jaws, the upper face of the outer end of the block formed with a stud comprising four equally-spaced, radially-arranged, rounded ribs and the underside of the block formed with a correspondingly-shaped recess.

2. A member for separable fasteners, comprising a block formed at its inner end with clamping-jaws, the upper face of the outer end of the block formed with a shoulder and a stud comprising four equally-spaced, radially-arranged, rounded ribs, and the underside of the block formed with a correspondingly-shaped recess.

In testimony whereof, I have signed this specification.

NATHAN WARSHAW.